US012628731B1

(12) United States Patent

Hale

(10) Patent No.: US 12,628,731 B1

(45) Date of Patent: May 19, 2026

(54) DISTRIBUTOR ATTACHMENT FOR A ZERO-TURN MOWER

(71) Applicant: Albert A. Hale, Stephenville, TX (US)

(72) Inventor: Albert A. Hale, Stephenville, TX (US)

( * ) Notice: Subject to any disclaimer, the term of this patent is extended or adjusted under 35 U.S.C. 154(b) by 243 days.

(21) Appl. No.: 18/382,253

(22) Filed: Oct. 20, 2023

Related U.S. Application Data

(60) Provisional application No. 63/417,759, filed on Oct. 20, 2022.

(51) Int. Cl.
| | |
|---|---|
| *A01C 17/00* | (2006.01) |
| *A01C 15/00* | (2006.01) |
| *A01D 43/14* | (2006.01) |
| *A01D 101/00* | (2006.01) |

(52) U.S. Cl.
CPC .......... *A01C 17/005* (2013.01); *A01C 15/006* (2013.01); *A01C 17/001* (2013.01); *A01D 43/14* (2013.01); *A01D 2101/00* (2013.01)

(58) Field of Classification Search
CPC ... A01C 17/005; A01C 17/001; A01C 15/006; A01D 43/14; A01D 2101/00
See application file for complete search history.

(56) References Cited

U.S. PATENT DOCUMENTS

| | | | | | |
|---|---|---|---|---|---|
| 2,737,340 | A | * | 3/1956 | Bonini | A01C 23/04 |
| | | | | | 56/16.8 |
| 3,102,375 | A | * | 9/1963 | Troka | A01D 43/14 |
| | | | | | 56/16.8 |

| | | | | | |
|---|---|---|---|---|---|
| 4,688,819 | A | * | 8/1987 | Reilly | A01B 59/067 |
| | | | | | 403/49 |
| 5,385,306 | A | * | 1/1995 | Cervenka | A01D 43/14 |
| | | | | | 239/289 |
| 5,485,963 | A | * | 1/1996 | Walto | A01C 15/02 |
| | | | | | 56/16.8 |
| 5,533,676 | A | * | 7/1996 | Conley | A01D 43/14 |
| | | | | | 239/289 |
| 5,860,604 | A | * | 1/1999 | Kooiker | A01C 15/007 |
| | | | | | 239/685 |

(Continued)

OTHER PUBLICATIONS

U.S. Appl. No. 80/333,552, filed Oct. 11, 2011, S. L. Jacobs et al.

*Primary Examiner* — Joseph A Greenlund
(74) *Attorney, Agent, or Firm* — Kramer Patent & Design, PLLC.; Aaron R. Cramer

(57) ABSTRACT

The present device relates to a distributor system for zero-turn mowers that addresses the need for efficient granular lawn care applications, such as fertilizers, herbicides, and insecticides. Attachable mechanically and electrically to a zero-turn mower, the distributor includes a granular material receptacle in conjunction with a transmission-housing shroud. A power control on the mower enables the spreader to distribute the granular material across the lawn. Important features include a quick-connect electrical connection, a detachable hopper mount, and an adjustable discharge gate. The distributor's construction, which is preferably made of stainless steel, provides durability and the possibility for on-site assembly. This device streamlines the process of lawn care by integrating granular material distribution with the mowing operation, thereby maximizing efficiency and minimizing the need for additional equipment.

2 Claims, 5 Drawing Sheets

(56)　　　　References Cited

U.S. PATENT DOCUMENTS

| | | | | |
|---|---|---|---|---|
| 6,336,600 B1 * | 1/2002 | Jessen | A01C 7/06 | 239/650 |
| 6,502,771 B1 * | 1/2003 | Wyne | A01C 17/001 | 239/661 |
| 6,907,832 B2 * | 6/2005 | Wyne | A01C 17/001 | 111/130 |
| 7,118,053 B2 * | 10/2006 | Truan | A01C 17/001 | 239/661 |
| 8,056,828 B1 * | 11/2011 | Kline | A01C 17/006 | 239/147 |
| 8,201,759 B2 * | 6/2012 | Kendall | A01C 17/001 | 239/650 |
| 8,668,154 B2 * | 3/2014 | O'Daniel | A01D 43/14 | 239/681 |
| 9,844,181 B2 * | 12/2017 | Hoppel | A01D 34/71 | |
| 10,271,537 B2 * | 4/2019 | Papke | A01M 9/0076 | |
| 11,118,321 B2 * | 9/2021 | Lehman | A01B 61/02 | |
| 11,324,165 B2 * | 5/2022 | Rothrock | A01D 43/14 | |
| 2004/0069194 A1 * | 4/2004 | Wyne | A01C 17/001 | 111/13 |
| 2006/0054722 A1 * | 3/2006 | Jones | A01C 17/001 | 239/663 |
| 2007/0012799 A1 * | 1/2007 | Kendall | A01C 17/001 | 239/164 |
| 2007/0194155 A1 * | 8/2007 | Kendall | A01C 17/006 | 239/650 |
| 2010/0006666 A1 * | 1/2010 | Kendall | A01C 15/06 | 239/650 |
| 2010/0200680 A1 * | 8/2010 | Hobbs, Jr. | A01C 15/006 | 239/687 |
| 2011/0309170 A1 * | 12/2011 | Weeks | A01C 15/006 | 239/668 |
| 2012/0090287 A1 * | 4/2012 | O'Daniel | A01C 15/18 | 56/16.8 |
| 2016/0014962 A1 * | 1/2016 | Hoppel | A01D 43/0635 | 56/16.8 |
| 2020/0315084 A1 * | 10/2020 | Yagyu | B60K 17/28 | |
| 2022/0279708 A1 * | 9/2022 | Dillon | A01C 17/005 | |
| 2022/0287238 A1 * | 9/2022 | Mika | A01D 43/077 | |
| 2025/0127089 A1 * | 4/2025 | Santos Vega | B05B 9/0403 | |
| 2025/0127096 A1 * | 4/2025 | Snyder | A01F 15/0816 | |

* cited by examiner

DISTRIBUTOR ATTACHMENT FOR A ZERO-TURN MOWER

RELATED APPLICATIONS

The present device was first described in and is a continuation of U.S. Provisional Application No. 63/417,759, filed Oct. 20, 2022, the entire disclosures of which are incorporated herein by reference.

FIELD OF THE DEVICE

The present device relates generally to a fertilizer distributor system attachable to a zero-turn mower.

BACKGROUND OF THE DEVICE

The American lawn has long been an emblem of homeownership pride and personal expression. Delicately manicured grass, blossoming flowers, perfectly pruned shrubs, and statuesque trees are all reflective of a homeowner's commitment to beautifying their property. This love affair with the lawn goes beyond mere aesthetics, becoming an avocation and, for some, a passionate pursuit.

Lawns are more than green stretches; they serve as a canvas, representing an individual's or family's personality and preferences. The act of mowing, planting, and maintaining these outdoor spaces is a testament to the meticulous care many Americans invest in their outdoor abodes. For properties that boast expansive grassy terrains, the need for efficient and effective lawn maintenance tools is paramount. Enter the zero-turning radius riding mowers.

Zero-turn mowers have taken the landscaping world by storm due to their agility and time-saving capabilities. Unlike traditional mowers, they possess the unique ability to pivot 360 degrees, allowing users to navigate tight corners and varied terrains with ease. Beyond this maneuverability, they provide the comfort of a seated position, making the mowing process more pleasurable. This combination of speed and comfort has rendered them immensely popular among homeowners with substantial lawn areas.

However, with every advancement comes a new challenge. For zero-turn mower users, this challenge lies in the realm of lawn nourishment. Fertilizers play an essential role in maintaining the vibrancy and health of a lawn. They provide the necessary nutrients that might be missing from the soil, ensuring lush, green, and healthy grass.

While there exist numerous fertilizer applicators tailored for traditional mowers and tractors, they fall short when it comes to compatibility with zero-turn mowers. The distinct 360-degree movement of these mowers makes conventional applicators unsuitable. This limitation compels homeowners to revert to manual push spreaders for fertilizer application. Essentially, while zero-turn mowers save time in cutting grass, the time advantage is offset when using a manual push fertilizer spreader. The use of the present device allows for the easy application of granular fertilizer and similar lawn care chemicals with a zero-turning radius riding mower in a manner that is quick, easy and effective.

SUMMARY OF THE DEVICE

Embodiments of the present disclosure may include a distributor device for a zero-turn mower including a mower mount. Embodiments may also include a shroud mount. Embodiments may also include a transmission. Embodiments may also include a shroud housing the transmission.

Embodiments may also include an electrical connection means for power source communication. In some embodiments, the distributor provides granular lawn care application means.

In some embodiments, the distributor may be powered by a twelve-volt direct current (12-VDC) motor mounted to a mower deck of the zero-turn mower. In some embodiments, the distributor may include a power switch mounted on a drive handle of the zero-turn mower, providing operational control of the distributor. In some embodiments, the shroud may include a shroud mount for removable attachment to a mower mount on the mower deck of the zero-turn mower.

In some embodiments, the distributor may include a hopper attached to the distributor. In some embodiments, the hopper may be mounted on a pair of hopper mounts, each having an upper arm and a lower arm connected by a bent portion, with the hopper and hopper mounts configured to move in tandem with the zero-turn mower. Embodiments may also include a spreader may be operably driven by the transmission via an axle when engaged thereby facilitating the distribution of a quantity of granular materials.

In some embodiments, the hopper has dimensions of approximately two to three feet in length, one foot in width, and twelve to sixteen inches in height, thereby facilitating storage and spread of the quantity of granular materials. In some embodiments, the spreader may be configured to be aligned with the hopper discharge, thereby facilitating even distribution of granular materials.

In some embodiments, the spreader may be subdivided into four areas for facilitating even distribution. In some embodiments, the spreader may be in mechanical communication with the transmission via an axle, enabling rotational movement. In some embodiments, the hopper may include a squared top opening with sloping walls leading to a bottom wall with a discharge. In some embodiments, the discharge may be configured to direct materials towards the spreader.

In some embodiments, the hopper may include a manually operable gate for selectively controlling material discharge. In some embodiments, the manual gate includes a handle with fixated positions, enabling selective limitation of material flow. In some embodiments, the hopper mounts may be C-shaped with a bent portion, allowing adjustable attachment to the shroud.

In some embodiments, the shroud may include a five-sided cuboid structure with an open bottom end, designed to house the transmission of the distributor. In some embodiments, the shroud mount may be configured for removable attachment to the zero-turn mower, thereby facilitating co-operational movement between the mower and distributor.

Embodiments may also include communication between the power source, power switch, and transmission may be through a quick-connect electrical coupling constituting the electrical connection means. In some embodiments, the shroud, hopper, and hopper mounts may be primarily constructed of stainless steel. In some embodiments, the distributor, may be configured for modular assembly on site, thereby facilitating flexible installation. Embodiments may also include materials may be loaded into the hopper. Embodiments may also include upon activating the power switch, the materials may be uniformly spread while the zero-turn mower may be in operation.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
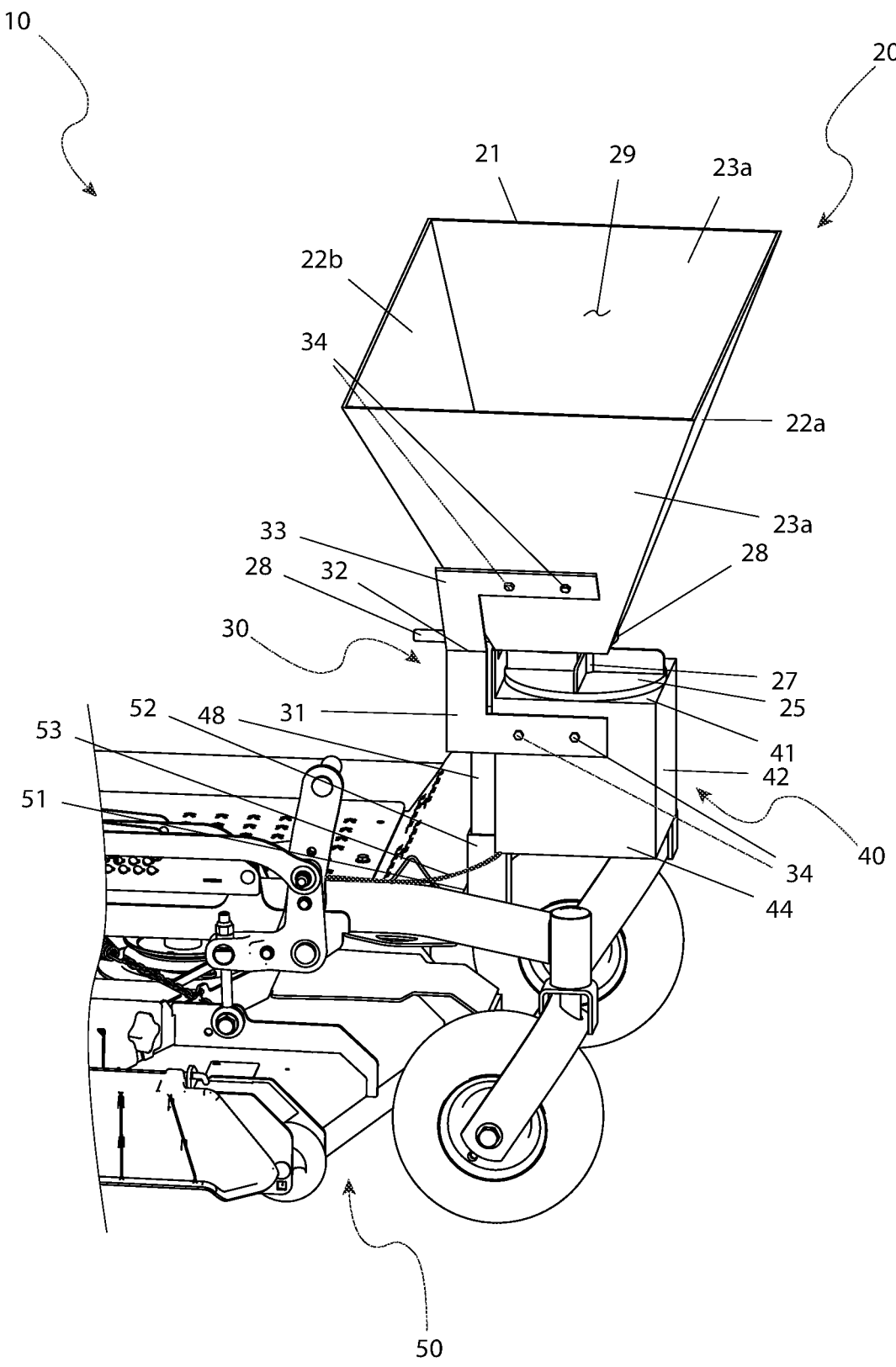
FIG. 1 is a side perspective view of a distributor 10 attached to a zero-turn mower 50, according to the preferred embodiment of the present device.
Figure 2:
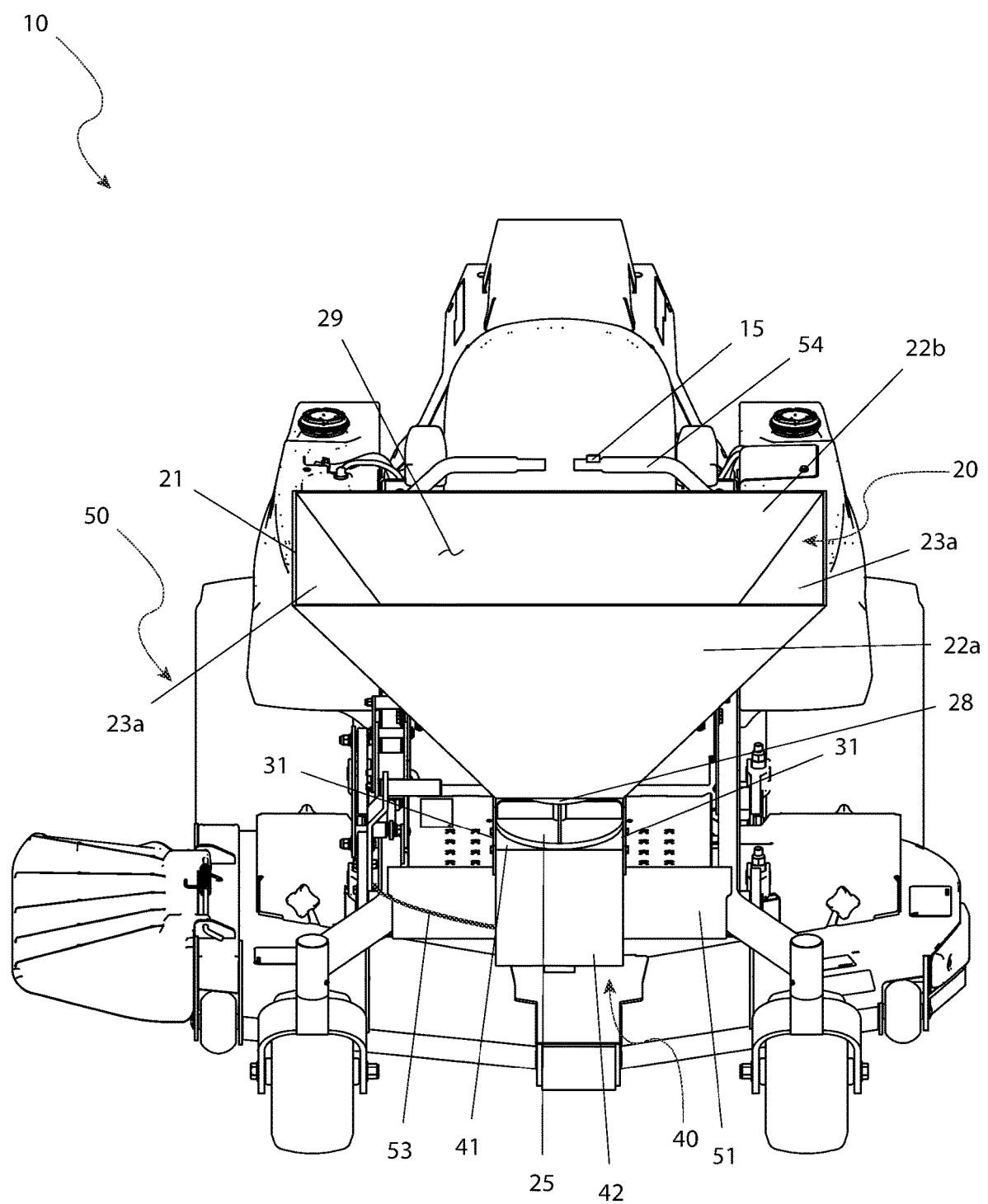
FIG. 2 is a front perspective view of the distributor 10 attached to a zero-turn mower 50, according to the preferred embodiment of the present device.
Figure 3:
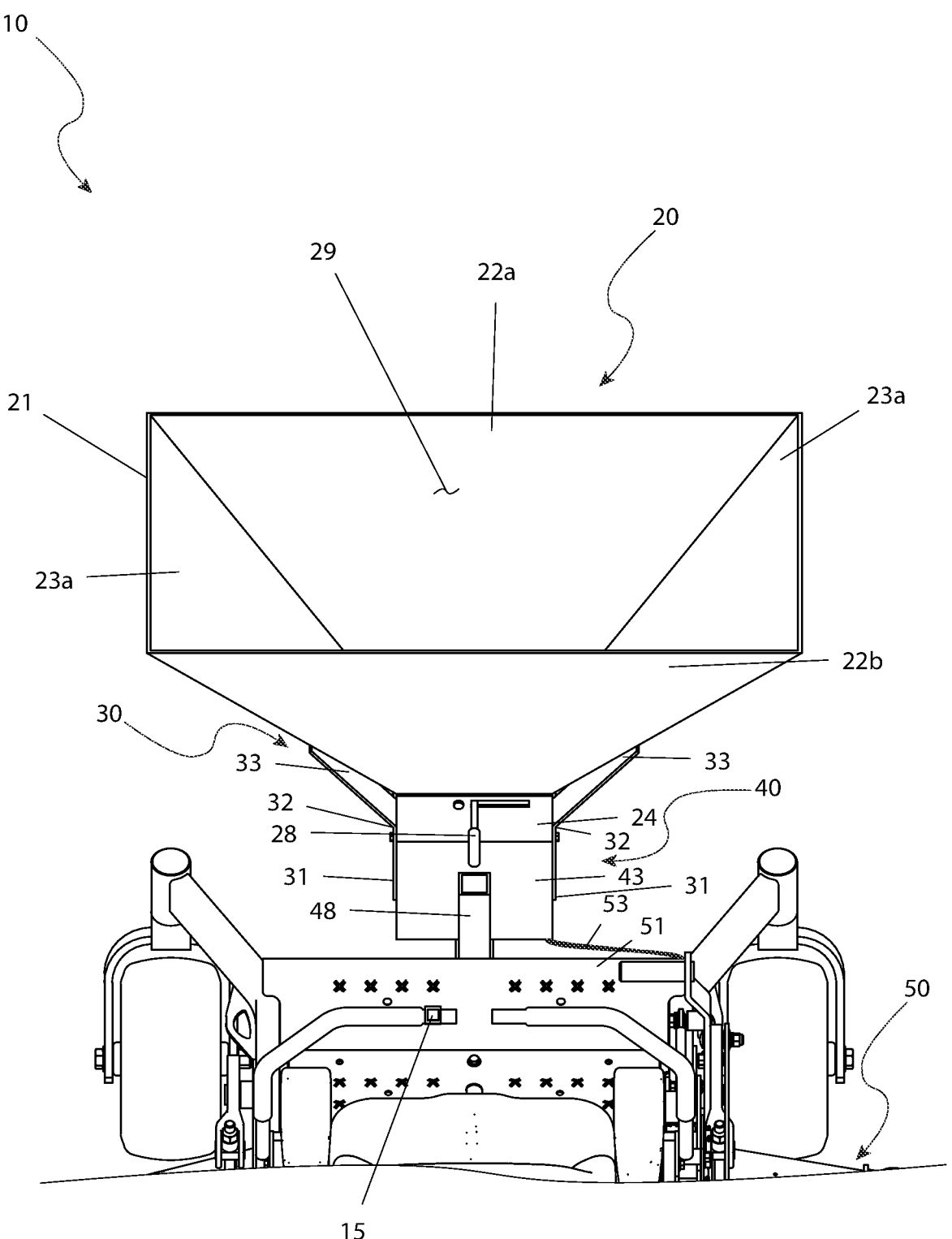
FIG. 3 is a rear perspective view of the distributor 10 attached to a zero-turn mower 50, according to the preferred embodiment of the present device.
Figure 4:
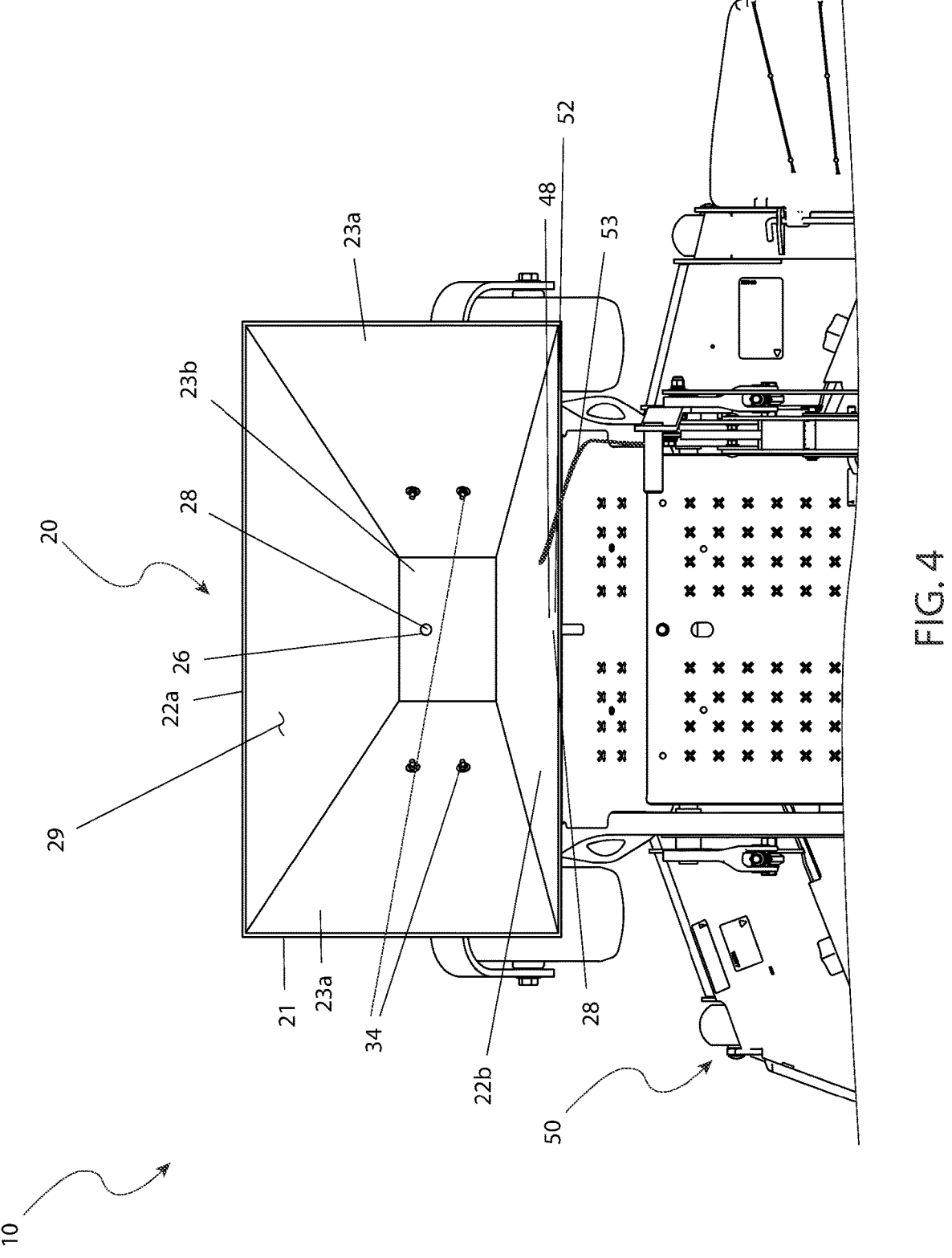
FIG. 4 is a top plan view of the distributor 10 attached to a zero-turn mower 50, according to the preferred embodiment of the present device; and, FIG. 5 is a bottom plan view of the distributor 10 attached to a zero-turn mower 50, according to the preferred embodiment of the present device.
Figure 5:

DESCRIPTIVE KEY 10 distributor
15 power switch
20 hopper
21 hopper top opening
22*a* hopper front wall
22*b* hopper rear wall
23*a* hopper sidewall
23*b* hopper bottom wall
24 hopper guard
25 spreader
26 discharge
27 axle
28 manual gate
29 hopper interior
30 hopper mount
31 lower arm
32 bent portion
33 upper arm
34 arm fastener
40 shroud
41 shroud top wall
42 shroud front wall
43 shroud rear wall
44 shroud sidewall
45 transmission
48 shroud mount
50 zero-turn mower
51 mower deck
52 mower mount
53 electrical connection means
54 drive handle Description of the Device The best mode for carrying out the device is presented in terms of its preferred embodiment, herein depicted within FIGS. 1 through 5. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items. Referring closely to FIG. 1, the distributor 10 is configured to be in mechanical and electrical attachment to a zero-turn mower 50. The distributor 10 is capable of providing a granular lawn care application means for operable control by elements on the zero-turn mower 50, such as a power source mounted to a mower deck 51. Also anticipated to be the source of the mechanical and electrical communications is a power switch 15, preferably mounted on either handle 54 of the driving means of the zero-turn mower 50. Such a power source is envisioned to be a twelve-volt direct current (12-VDC) motor. An electrical connection means 53 is utilized to provide the electrical communication between the power source and power switch 15 on the zero-turn mower 50 and the transmission 45. In a preferred embodiment, the electrical connection means 53 is a quick-connect electrical coupling. The transmission 45 is housed within a shroud 40. The shroud 40 comprises a shroud mount 48 capable of removable attachment to a mower mount 52 affixed to a front of the mower deck 51. The transmission 45 should be coincidentally motioned in tandem with travel of the zero-turn mower 50 as it is secured thereto.

A pair of hopper mounts 30 provide an attachment between the hopper 20 and the shroud 40. A hopper 20 is removably mounted to an upper portion of each hopper mount 30. The bottom portion of each hopper mount 30 is removably mounted to the shroud 40. The hopper 20 and hopper mounts 30 should be motioned in tandem with travel of the zero-turn mower 50 and shroud 40 as they are secured thereto. The hopper includes a spreader 25 that is operably motioned by the transmission 45 when contacted thereby. Operation of the power switch 15 provides activation for the power source to operably control the spreader 25 via the electrical connection means 53 and the transmission 45.

The overall length of the distributor 10 at the largest portion at the hopper 20 is approximately two to three feet (2-3 ft.). The overall width of the distributor 10 at the largest portion at the hopper 20 is one foot (1 ft.). The overall height of the distributor 10 is in the range of twelve to sixteen inches (12-16 in.). These dimensions are particularly suited for enabling the hopper 20 to hold adequate quantity of material, such as granular fertilizer, herbicides, and/or insecticides within a hopper interior 29 and provide the capability of providing electrical communication to operably spread the material while concurrently driving the zero-turn mower 50.

Referring now to FIGS. 1-5, the shroud 40 is preferably a five-sided box-like structure with an open bottom end. The shroud 40 further comprises a shroud top wall 41, a shroud front wall 42, a shroud rear wall 43, and a pair of shroud sidewalls 44. In other certain embodiments, there may be a shroud bottom wall. The transmission 45 is housed within the shroud 40 and is motionable relative thereto. The transmission 45 may include a prime mover, such as an electric motor, and a driving means. A portion of the driving means of the transmission 45, such as an axle 27, extends upward through a centrally positioned aperture of the shroud top wall 41. Affixed or otherwise attached to a central location of the shroud rear wall 43 and extending rearwardly away therefrom is the shroud mount 48. The shroud mount 48 is capable of removable and securable mechanical connection to the mower mount 52 of the zero-turn mower 50. The shroud mount 48 and mower mount 52 are preferably couplable tubular frame members such as square tubing and may further comprises a securing fastener, such as a positive locking pin. The mounting of the distributor 10 to the zero-turn mower 50 shall provide a co-operationally balanced tandem movement.

The hopper 20 generally has a squared hopper top opening 21 leading into a hopper interior 29. The hopper includes a hopper front wall 22*a*, a hopper rear wall 22*b*, a pair of hopper sidewalls 23*a*, and a hopper bottom wall 23*b*, and a spreader 25 movable relative thereto. The hopper front wall 22*a*, hopper rear wall 22*b*, and hopper sidewalls 23*a* all slope downward from the squared hopper top opening 21 to the hopper bottom wall 23*b*. The hopper front wall 22*a*, hopper rear wall 22*b*, and hopper sidewalls 23*a* provide a four-sided structure where the edges are fastened together, either directly or via a frame element. Located on the hopper bottom wall 23 is a discharge 26, which may be at the direct center thereof, or slightly off-center. The hopper bottom wall 23*b* may also be sloped to direct any material to the discharge 26.

Suspended downward from the hopper bottom wall 23*b* and preferably an integral part thereof, is a hopper guard 24. The hopper guard 24 is a generally L-shaped bracket supporting the hopper bottom wall 23*b* to the shroud rear wall 43. Movably attachable to an outer surface of the hopper bottom wall 23*b* and covering the discharge 26, is a manual gate 28 that can be manipulated to provide full closure, partial opening, or full opening of the discharge 26. The manual gate 28 further comprises a handle that protrudes rearwardly through the hopper guard 24 to effect manual manipulation thereof. The manual gate 28 is capable of selectively blocking the discharge 26 when motioned by the handle. The handle may further incorporate fixated positions that correspond to differing partial blockages of the discharge 26, thereby selectively limiting the amount of flow of and the application rate of the therethrough and henceforth. Other embodiments may provide incremental opening positions for the manual gate 28. In other embodiments, the hopper guard 24 is a planar plate that is attached to the shroud rear wall 43 only and has a space to enable the passage of the handle of the manual gate 28.

Each hopper mount 30 is generally a squared-off C-shaped arm feature, having a bent portion 32 located at the center thereof to define a lower arm 31 and an upper arm 33. The lower arm 31 of each hopper mount 30 is adjustably attached to vertically-aligned positions on each shroud sidewall 44. Such an adjustable attachment is performed by at least one (1) arm fastener 34 which may include a pivoting or a rotating means. The bent portion 32 enables the upper arm 33 of each hopper mount 30 to have a flush contact with the slope of the outer surface of the hopper sidewalls 22 located above the shroud sidewalls 44. The upper arm 33 of each hopper mount 30 is similarly fastener to opposing vertically-aligned positions on the hopper sidewalls 23*a* with at least one (1) arm fastener 34.

The spreader 25 is mounted to the shroud top wall 41 and aligned with the discharge 26, such that material in the hopper interior 29 is directed there-towards. The spreader 25 is capable of being driven in a rotational motion about the axle 27 while relative to the hopper bottom wall 23. The spreader 25 is located between the hopper bottom wall 23 and shroud top wall 41 and aligned with the discharge 26. The spreader 25 may include a plate subdivided into four (4) areas via a divider. In the exemplary embodiment, the spreader 25 is configured to be in mechanical communication with, and operably driven by, the driving means of the transmission 45. Some embodiments provide where the axle 27 is contacted by and driven by the driving means. The transmission 45, as mentioned above, is in electrical communication with the power source and power switch 15 via the electrical connection means 55. Thusly, any material within the hopper interior 29 is capable of being spread when the material contacts the spreader 25 when the spreader 25 is operably controlled by the driving means of the transmission 45, as activated by the power switch 15.

The shroud 40, shroud mount 48, hopper mounts 30, and hopper 20 are each preferably constructed out of stainless steel and may be easily constructed and installed on site, either as a unitary device or as a modular and assembled construction.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A distributor device for a zero-turn mower comprising:
   a shroud having a shroud top wall, a shroud front wall, a shroud rear wall, and a pair of opposed shroud sidewalls defining an open bottom, the shroud containing a transmission that includes a prime mover and a drive member extending upwardly through an aperture in the shroud top wall;
   a shroud mount rigidly secured to the shroud rear wall and configured for removable attachment to a mower mount fixed to a front region of a mower deck of the zero-turn mower so that the shroud moves in tandem with the zero-turn mower, the shroud mount and the mower mount comprising cooperable tubular frame members configured to receive a positive locking fastener;
   a pair of hopper mounts, each hopper mount including a lower arm attached to a corresponding one of the shroud sidewalls, an upper arm attached to a corresponding sidewall of a hopper, and a bent portion between the lower arm and the upper arm positioning the hopper above the shroud;
   the hopper being supported by the pair of hopper mounts and defining a hopper interior bounded by a hopper front wall, a hopper rear wall, opposed hopper sidewalls, and a hopper bottom wall, the hopper bottom wall including a discharge opening;
   a spreader disposed between the hopper bottom wall and the shroud top wall and fixed to the drive member of the transmission so as to be rotatable within the discharge opening to receive granular lawn care material from the hopper interior;
   a hopper guard extending from the hopper bottom wall toward the shroud rear wall and secured to the shroud rear wall, the hopper guard defining a passage between the hopper bottom wall and the shroud rear wall;
   a manual gate slidably mounted to the hopper bottom wall and configured to selectively cover the discharge opening, the manual gate including a handle that extends through the passage in the hopper guard to a location accessible behind the hopper;
   a power switch mounted on a drive handle of the zero-turn mower; and an electrical connection assembly comprising an electrical cable harness extending between a power source on the mower deck, the power switch on the drive handle, and the transmission within the shroud, the electrical connection assembly including a quick-connect electrical coupling located between the zero-turn mower and the transmission and configured to permit the distributor device to be electrically connected to and disconnected from the zero-turn mower; and wherein, when the distributor device is mounted to the zero-turn mower and the power switch is actuated, the transmission rotates the spreader to distribute granular lawn care material discharged from the hopper while the zero-turn mower is in motion.

2. The distributor device of claim 1, wherein:

the lower arm of each hopper mount is attached to a corresponding shroud sidewall at one of a plurality of vertically aligned positions by at least one arm fastener, and the upper arm of each hopper mount is attached to a corresponding hopper sidewall at one of a plurality of vertically aligned positions by at least one arm fastener, such that a vertical position of the hopper relative to the shroud is adjustable by repositioning the arm fasteners; and wherein each of the shroud, the shroud mount, the hopper mounts, and the hopper comprises stainless steel.

\* \* \* \* \*